US 7,994,691 B2

(12) United States Patent
George et al.

(10) Patent No.: US 7,994,691 B2
(45) Date of Patent: Aug. 9, 2011

(54) SYSTEMS, METHODS, AND APPARATUS FOR CONTROLLING KEY BAR MOVEMENT IN A STATOR ASSEMBLY

(75) Inventors: Jayan George, Glenville, NY (US); John R. Yagielski, Scotia, NY (US); Donald Ronca, Clifton Park, NY (US); Srujana Tayi, Bangalore (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/478,361

(22) Filed: Jun. 4, 2009

(65) Prior Publication Data
US 2010/0308687 A1 Dec. 9, 2010

(51) Int. Cl.
*H02K 1/12* (2006.01)
(52) U.S. Cl. ......... 310/422; 310/419; 310/431; 310/433
(58) Field of Classification Search .......... 310/418, 310/216.049, 216.051, 216.055, 216.086, 310/419, 422, 431, 433, 254.1, 216.007–216.009, 310/216.135
See application file for complete search history.

(56) References Cited

U.S. PATENT DOCUMENTS

| | | | | |
|---|---|---|---|---|
| 681,800 | A | * | 9/1901 | Lasche .............. 310/216.114 |
| 2,554,226 | A | * | 5/1951 | Taylor ..................... 310/431 |
| 4,217,510 | A | * | 8/1980 | Detinko et al. .............. 310/51 |
| 4,425,523 | A | * | 1/1984 | Detinko et al. ............. 310/433 |
| 4,634,909 | A | * | 1/1987 | Brem ........................... 310/91 |
| 5,390,409 | A | | 2/1995 | Courtney |
| 6,346,760 | B1 | | 2/2002 | Boardman, IV |
| 6,548,928 | B2 | | 4/2003 | Walko |
| 6,597,081 | B2 | | 7/2003 | Dawson |
| 6,651,986 | B2 | | 11/2003 | Chevrette |
| 6,775,900 | B2 | | 8/2004 | Dawson |

FOREIGN PATENT DOCUMENTS

| | | |
|---|---|---|
| GB | 660942 A | 11/1951 |
| GB | 821612 A | 10/1959 |
| GB | 2121614 A | 12/1983 |
| GB | 2164501 A | 3/1986 |

OTHER PUBLICATIONS

GB 1008812.8, Search Report and Written Opinion, Sep. 20, 2010.

* cited by examiner

*Primary Examiner* — Dang D Le
(74) *Attorney, Agent, or Firm* — Sutherland Asbill & Brennan LLP

(57) ABSTRACT

Systems, methods, and apparatus for controlling key bar movement in a stator assembly are provided. According to one embodiment, a stator assembly is provided that includes multiple core ring compression bands longitudinally spaced apart and disposed around a stator core having a plurality of key bars radially spaced apart and extending longitudinally along a peripheral edge of the stator core. Each of the core ring compression bands can be formed from multiple semi-circular sections coupled to form the respective core ring compression band. Each of the key bars can be disposed within respective cutouts defined in an inner edge of the core ring compression bands.

19 Claims, 6 Drawing Sheets

FIG. 1 – Prior Art

SYSTEMS, METHODS, AND APPARATUS FOR CONTROLLING KEY BAR MOVEMENT IN A STATOR ASSEMBLY

FIELD OF THE INVENTION

This invention relates generally to rotating machinery, and more specifically relates to providing systems, methods, and apparatus for controlling key bar movement in a stator assembly.

BACKGROUND OF THE INVENTION

A stator of rotating machinery, such as an electric power generator, generally includes a stator core and a stator frame. The stator core typically has a cylindrical shape and consists of coaxially stacked insulated ferrous laminations. Conventional laminations are formed from semi-circular lamination sections that when spaced around a common axis form an entire lamination. Each lamination has slots to accommodate a stator winding and cutouts defined on its peripheral edge to define key bar grooves for accommodating key bars.

Key bars are provided along the peripheral edge of the laminations, radially spaced apart along its periphery, to provide structural support. For example, in conventional assemblies, the cutouts formed in the lamination sections can be formed in a dovetail shape to compliment a dovetail shape of the inward facing edge of each key bar. During assembly, each lamination can be installed onto one or more corresponding key bars by sliding onto or over the dovetail. Thus, key bars aid in orienting and assembling the lamination sections when forming a stator core, and also provide structural integrity after assembly and during operation.

In conventional stator assemblies, such as illustrated by the example stator assembly 100 in FIG. 1, multiple core support rings 110 are welded or otherwise affixed to the key bars 120 and integrated with the stator frame within which the stator core is contained. Similarly, multiple rigid core rings 140 are welded to or otherwise affixed to the key bars 120. The core support rings 110 serve to integrate the stator core with the stator frame (e.g., affixed to the stator frame or integrated via spring bars 150). The multiple rigid core rings 140 serve to provide additional structural integrity to the key bars 120 and the stator core, attempting to maintain the key bar 120 positions within a predefined tolerance.

During operation, however, the stator core changes shape due to the electromagnetic force pulling each lamination section inwardly toward the central axis defined through the center of the stator core. For example, in some installations, a stator core can be subject to movements at a frequency at or near 120 Hertz. The rapid stator core movements in turn cause a condition commonly referred to as "key bar rattle," whereby the lamination sections rattle against the key bars due to the voids that may exist between the key bar dovetails and the lamination cutouts. In an attempt to counter key bar rattle, flat, conventional compression bands 160 have been positioned around the key bars 120 between the rigid core rings 140. The conventional, flat compression bands 160 can be tightened to exert an inward radial force in an attempt to tighten key bars 120 against the laminations within a desired tolerance. However, due to the rigid core rings 140 placed along the length of the stator core and welded to the key bars 120, the conventional, flat compression bands 160 and the rigid core rings 140 oppose each other. For example, the rigid core rings 140 have an inner diameter and retain the key bars 120 to that inner diameter. However, when the conventional, flat compression bands 160 are placed around the key bars 120 and an inward radial force is exerted, the key bars 120 remain attached to the rigid core rings 140 at the inner diameter and resist the inward radial force exerted by the conventional, flat compression bands 160. In these conventional assemblies, the rigid core rings 140 were installed to provide both radial and circumferential integrity to the key bars 120, and thus the stator core laminations. The conventional, flat compression bands 160 were added to reduce key bar rattle.

Accordingly, there exists a need for an apparatus to control key bar movement while providing structural integrity to a stator core assembly.

Furthermore, a need exists for systems, methods, and apparatus for controlling key bar movement in a stator assembly.

BRIEF DESCRIPTION OF THE INVENTION

Certain embodiments of the invention can address some or all of the above needs. According to embodiments of the invention, systems, methods, and apparatus for controlling key bar movement in a stator assembly are provided. According to one embodiment, a stator assembly is provided. The stator assembly can include a stator core having a plurality of coaxially stacked laminations, each lamination formed from a plurality of lamination sections having at least one cutout defined in a peripheral edge. The cutouts are axially aligned among the stacked laminations to define multiple key bar grooves radially spaced apart and extending longitudinally in a peripheral edge of the stator core. The stator assembly can further include multiple key bars, each key bar disposed within a respective one of the key bar grooves, and at least a first core support ring and a second core support ring longitudinally spaced apart and disposed around the stator core, wherein each of the key bars is affixed to an inner edge of the first core support ring and the second core support ring. The stator assembly can further include multiple core ring compression bands longitudinally spaced apart and disposed around the stator core and the key bars, wherein each of the core ring compression bands is formed from a plurality of semi-circular sections coupled to form the respective core ring compression band, and wherein each of the key bars is disposed within respective cutouts defined in an inner edge of the core ring compression bands. A stator frame can be provided to which the first core support ring and the second core support ring are mounted.

According to another embodiment, a stator assembly is provided. The stator assembly can include multiple core ring compression bands longitudinally spaced apart and disposed around a stator core having a plurality of key bars radially spaced apart and extending longitudinally along a peripheral edge of the stator core. Each of the core ring compression bands can be formed from multiple semi-circular sections coupled to form the respective core ring compression band. Each of the key bars can be disposed within respective cutouts defined in an inner edge of the core ring compression bands.

According to yet another embodiment, a stator assembly is provided. The stator assembly can include multiple key bars extending longitudinally and circumferentially spaced apart; at least two core support rings longitudinally spaced apart around the key bars and affixed to the plurality of key bars, wherein at least two core support rings are integrated to a stator frame; and multiple core ring compression bands longitudinally spaced apart around the key bars, wherein each of the core ring compression bands is formed from multiple semi-circular sections coupled to form the respective core ring compression band. The stator assembly can further include multiple laminations coaxially stacked within the key bars to form a stator core, each of the plurality of laminations having multiple lamination sections with at least one cutout defined in a peripheral edge. The cutout of each lamination section is axially aligned among the stacked laminations to define multiple key bar grooves extending longitudinally in a peripheral edge of the stator core and substantially aligning with the key bars.

Other embodiments, aspects, and features of the invention will become apparent to those skilled in the art from the following detailed description, the accompanying drawings, and the appended claims.

BRIEF DESCRIPTION OF THE DRAWINGS

Figure 1:
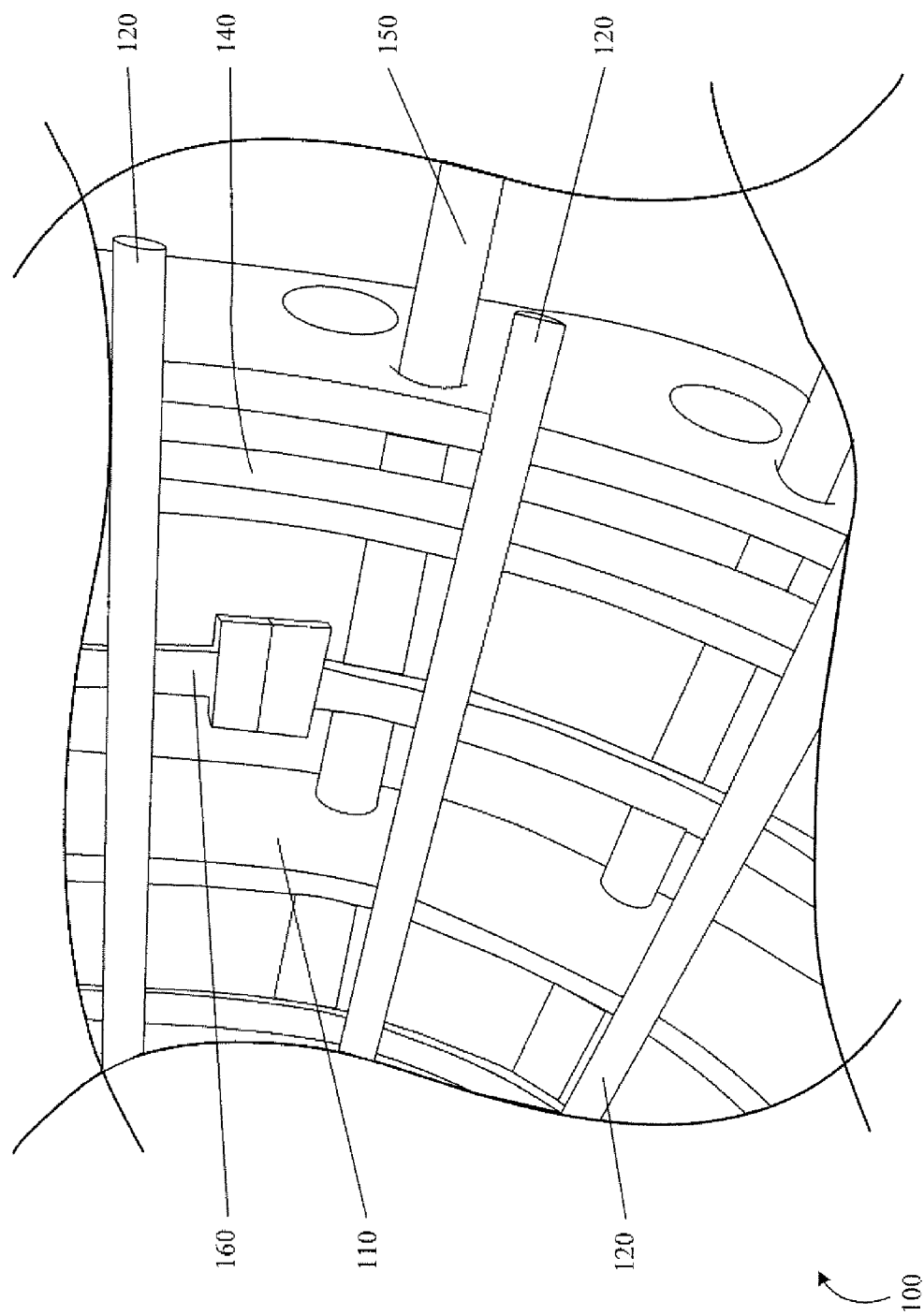

Having thus described embodiments the invention in general terms, reference will now be made to the accompanying drawings, which are not necessarily drawn to scale, and wherein:

FIG. 1 is a partial diagram illustrating a conventional stator assembly.

Figure 2:
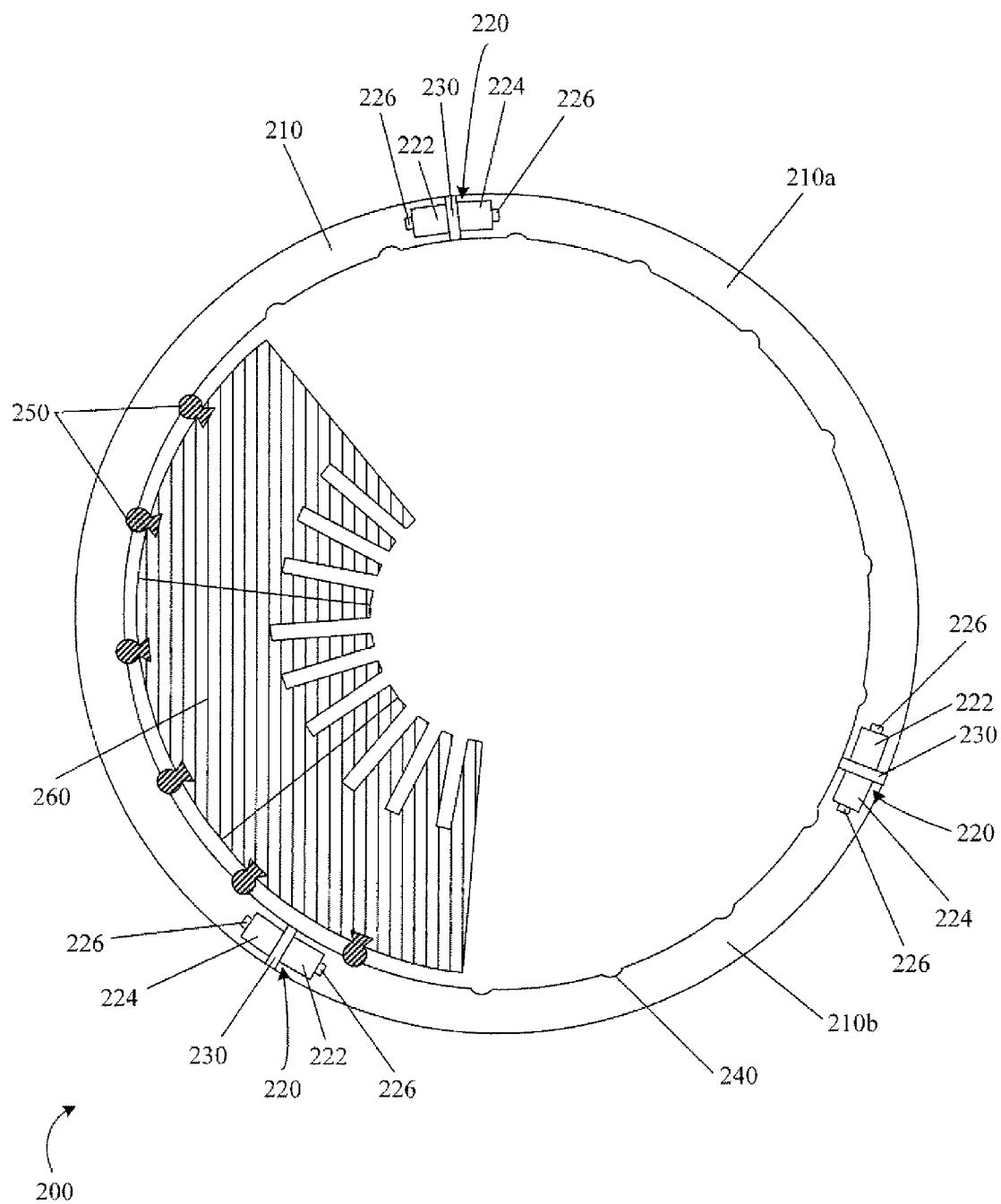

FIG. 2 is a diagram illustrating an example core ring compression band, in accordance with an embodiment of the invention.

Figure 3:
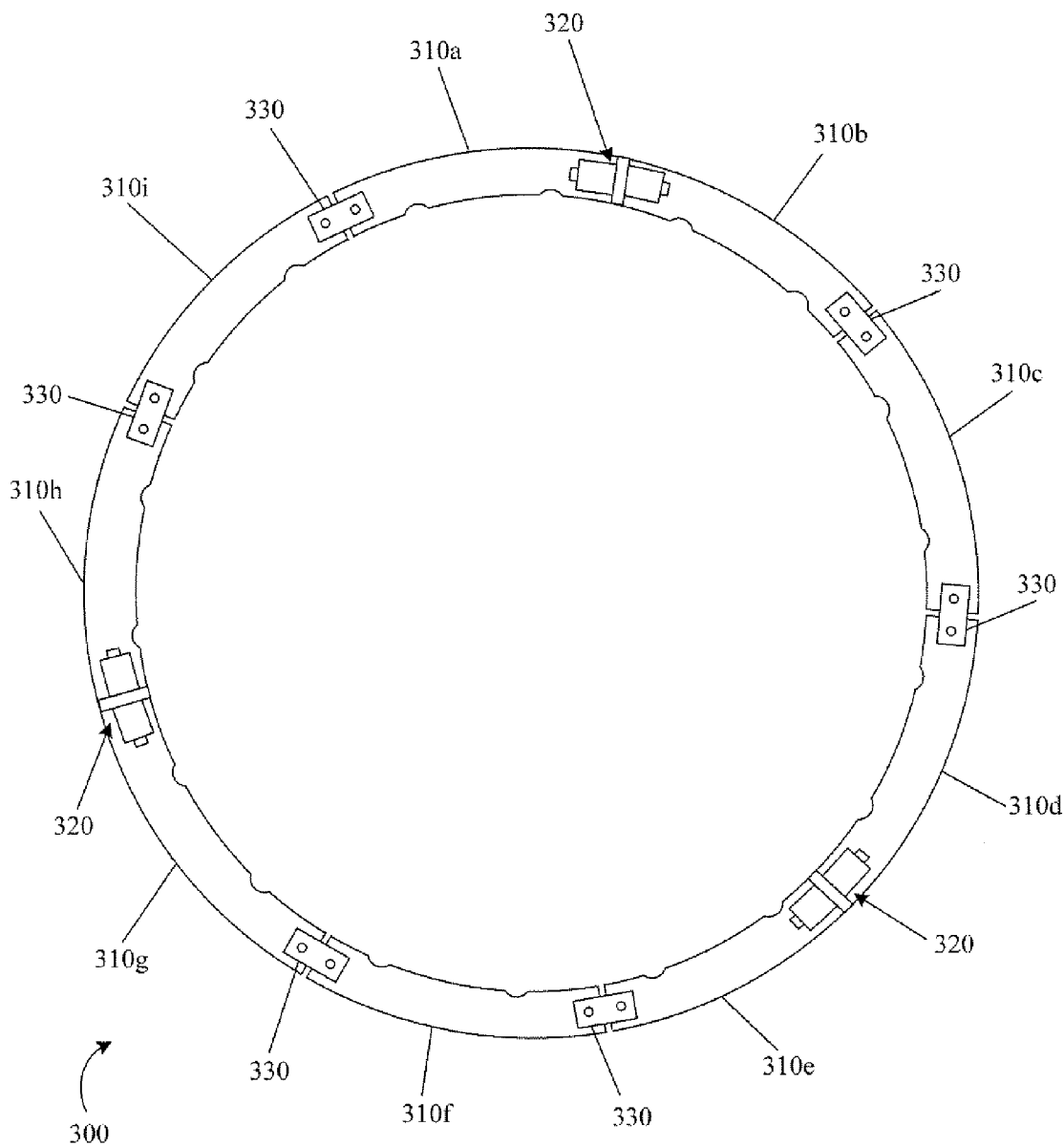

FIG. 3 is a diagram illustrating an example core ring compression band, in accordance with an embodiment of the invention.

Figure 4:
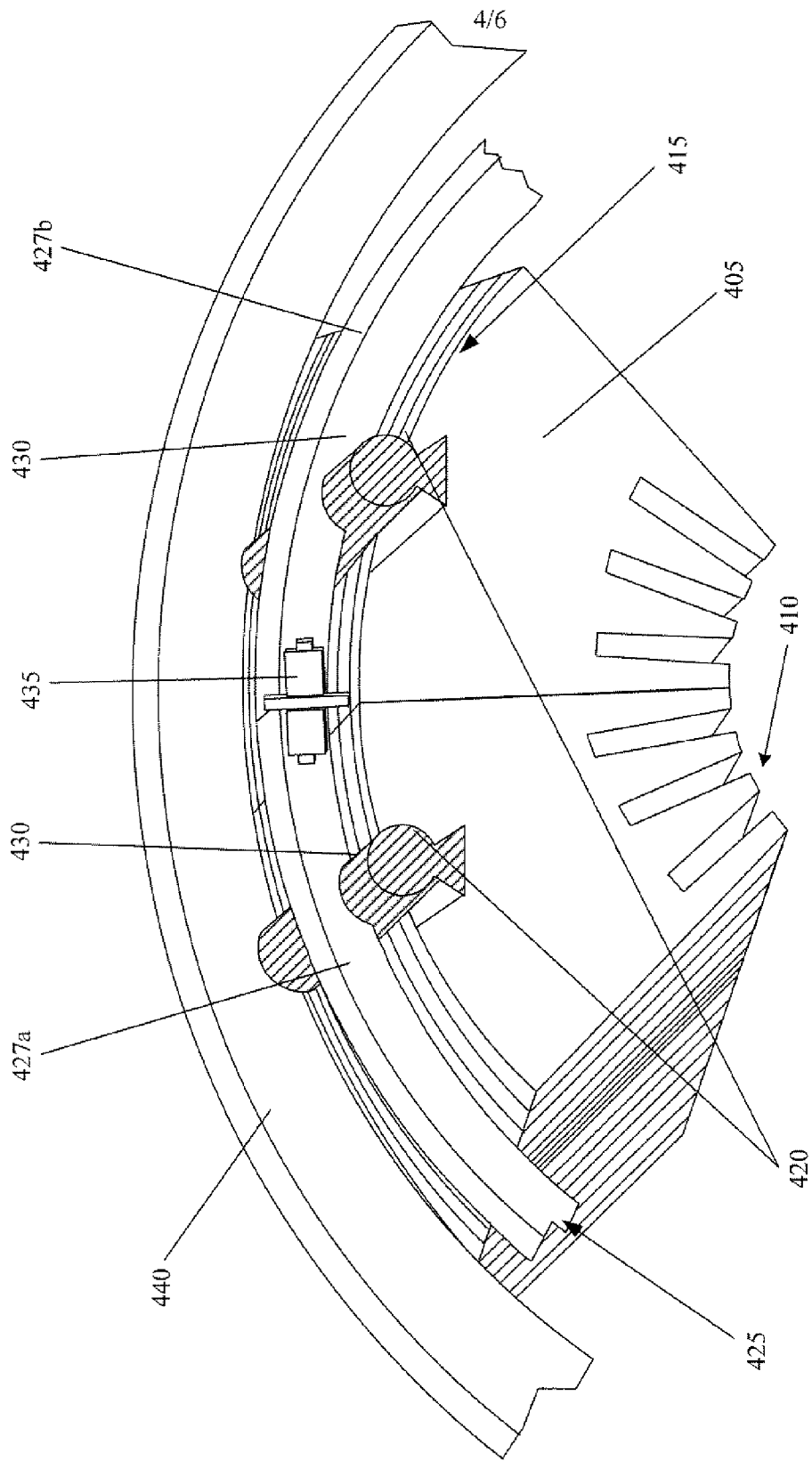

FIG. 4 is a partial diagram illustrating a perspective of an example stator assembly, in accordance with an embodiment of the invention.

Figure 5:
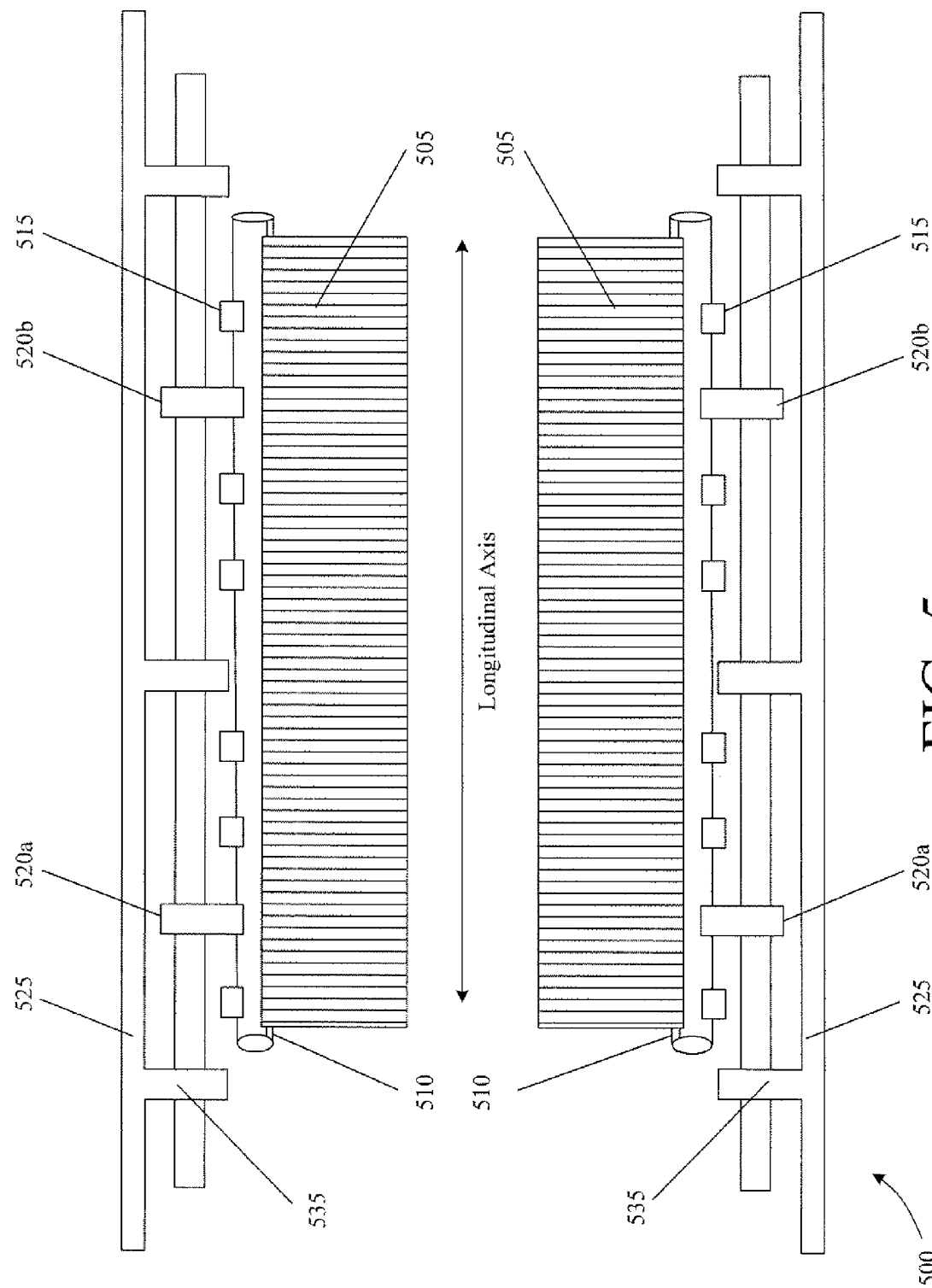

FIG. 5 is a cross-section diagram illustrating an example stator assembly, in accordance with an embodiment of the invention.

Figure 6:
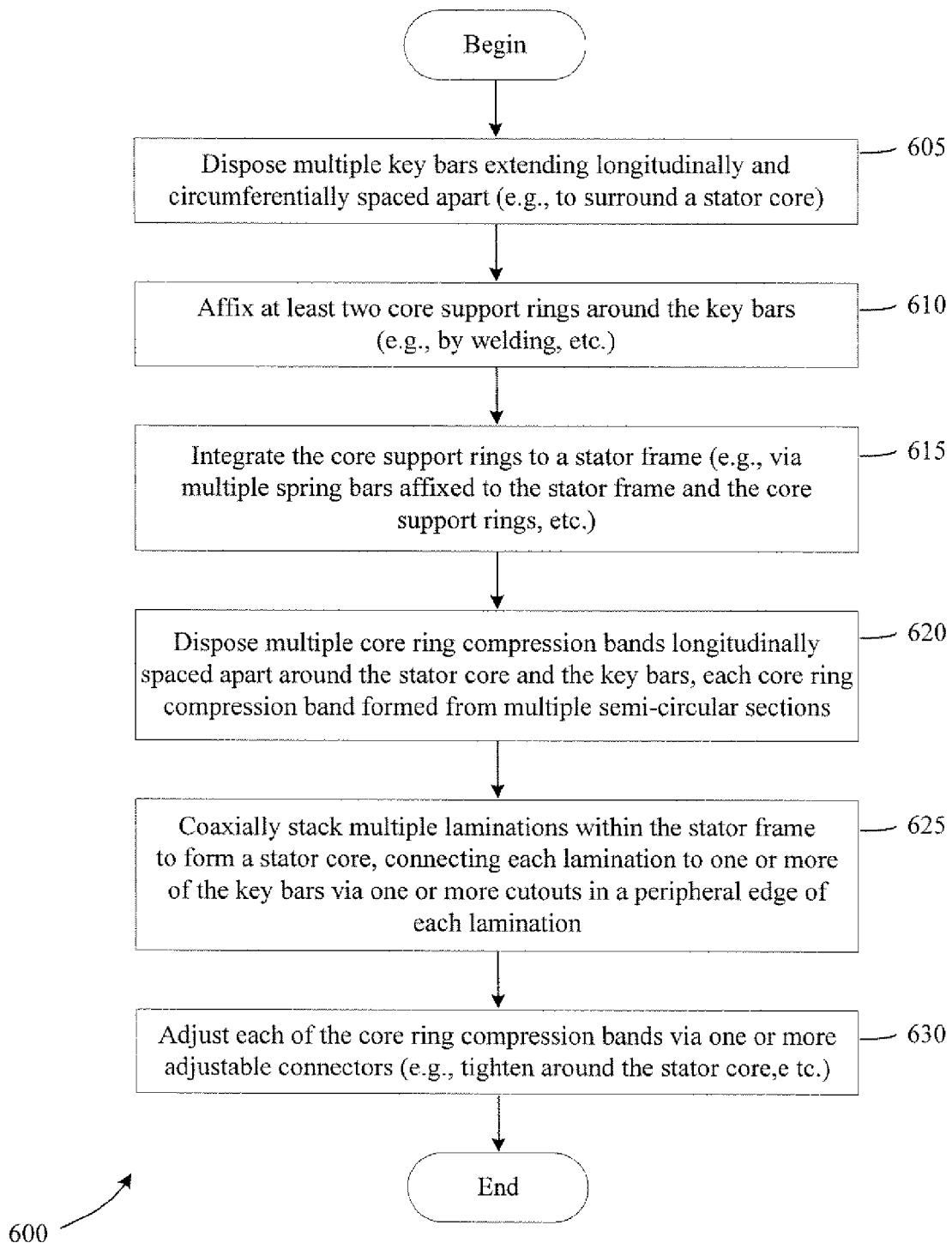

FIG. 6 is a flowchart illustrating an example method for assembling a stator assembly, in accordance with an embodiment of the invention.

DETAILED DESCRIPTION OF THE INVENTION

Illustrative embodiments of the invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Disclosed are systems, methods, and apparatus for controlling key bar movement in a stator core assembly. According to various embodiments, the stator core assembly may include a stator core formed from a plurality of coaxially stacked laminations, each lamination made from a plurality of lamination sections. The lamination sections can be formed to have at least one cutout defined in a peripheral edge of the lamination section, such that the cutouts can be axially aligned among the stacked laminations to define a key bar grooves radially spaced apart and extending longitudinally in a peripheral edge of the stator core. The key bar grooves permit a key bar to be disposed within each of the key bar grooves. For example, the cutouts can be formed in a dovetail shape and the key bars can be formed with a dovetail on one side complimenting the dovetail shape of the cutouts. The key bars thus are included to provide structural stability to the lamination sections during assembly and operation. According to one embodiment, at least a first core support ring and a second core support ring longitudinally spaced apart are disposed around the stator core, such that each of the key bars is affixed (e.g., welded, inserted, bolted, etc.) to an inner edge of the first core support ring and the second core support ring. The core support rings can be affixed to or otherwise integrated with a stator frame within which the stator core is contained.

To further promote structural rigidity, and to control key bar movement, multiple core ring compression bands are provided instead of rigid core rings and conventional, flat compression bands, as described above with reference to a conventional stator assembly illustrated by FIG. 1. The core ring compression bands can be longitudinally spaced apart and disposed around the stator core and the key bars. According to one embodiment, each of the core ring compression bands is formed from a multiple semi-circular sections coupled to form the respective core ring compression band. In addition, to promote structural integrity and improve the interface with each of the key bars, cutouts can be defined in an inner edge of the each core ring compression band, such that the outer edge (extending from the stator core) of the key bars fit within the cutouts in each of the core ring compression bands.

According to various embodiments, the multiple semi-circular sections of the core ring compression bands can be adjustably coupled (e.g., any adjustable fastener, such as a nut and bolt assembly, a ratchet assembly, a latch assembly, etc.) to facilitate assembly and to permit adjusting the inward radial force exerted by the core ring compression bands against the key bars. Thus, instead of working against rigid core ring members, as occurred in the previously attempted solutions, the core ring compression bands provide are not entirely rigid (due to the multiple sections) and do not require rigid core rings because of the cutouts within which key bars are disposed.

FIG. 2 is a diagram of an example core ring compression band 200 for controlling movement of multiple key bars 250 disposed around a stator core made from multiple lamination sections 260, according to one embodiment. The core ring compression band 200 can be formed from multiple individual semi-circular core ring sections 210a, 210b, 210c (also referred to interchangeably herein as "semi-circular sections") that are coupled together to form a single core ring compression band 200. According to one embodiment, the core ring compression band 200 can be formed from three semi-circular sections 210a, 210b, 210c. However, according to other embodiments, any other number of semi-circular sections may be coupled together to form a core ring compression band 200.

The semi-circular sections 210a, 210b, 210c can be coupled via one or more adjustable connectors 220, according to one embodiment. For example, as illustrated by FIG. 2, one end of the first semi-circular section 210a can be coupled to a contiguous end of the second semi-circular section 210b via an adjustable connector 220, and so on. In other embodiments, however, not all semi-circular sections are coupled via an adjustable connector 220, but instead some may be coupled via a non-adjustable connector (e.g., bolted, screwed, riveted, welded, etc.). Adjustable connectors 220 permit adjusting the tension and thus the inward radial force exerted by the core ring compression band 200 on the key bars 250— both during installation and during operation.

According to one example embodiment, an adjustable connector 220 may be a bolt fastening assembly including a first fastening block 222 integrated with or otherwise affixed to one end of a first semi-circular section 210a, and a second fastening block 224 integrated with or otherwise affixed to the end of the a contiguous second semi-circular section 210b. One or more at least partially threaded bolts 226 are insertable through one or more complimentarily threaded apertures formed through each of the first and second fastening blocks 222, 224. According to various embodiments, the threaded apertures formed through the first and the second fastening blocks 222, 224 may include a locking apparatus, such as a locking nut and the like. Though, according to other embodiments, one or more separate locking mechanisms, such as a locking nut and the like, may be threadably inserted over the bolt end. Accordingly, adjustments can be made by tightening or loosening the threaded bolt 226 within the adjustable connector 220. While the adjustable connector 220 is described by example herein as embodying a bolt-type fastening assembly, any other adjustable fastening assembly suitable for adjustably connecting two contiguous ends of semi-circular sections may be provided.

During assembly of the core ring compression bands 200 around the key bars 250, one or more shims 230 may be provided in between the adjustable assemblies to facilitate alignment and retaining tension of the core ring compression bands 200 against the key bars 250 and thus indirectly against the lamination sections 260. The shims 230 may further be removed or adjusted during assembly, such as after the stator core is completely assembled and the core ring compression bands 200 are being adjusted via respective adjustable connectors 220.

Each of the semi-circular sections 210a, 210b, 210c also include cutouts 240 formed in the inner edge of each. The cutouts 240 are formed to permit a corresponding key bar 250 to fit within each respective cutout 240. Accordingly, the cutouts 240 can be formed to have a shape complimentary to the cross-section shape of the outward facing portion of the key bar 250 to provide a more secure interface between the core ring compression band 200 and the key bars 250. The open semi-circular shape illustrated by FIG. 2 facilitates simple installation of the core ring compression bands 200 and retain positioning of the key bars 250, permitting each core ring compression band 200 to pushed against the key bars 250, without having to slide or otherwise manipulate the core ring compression bands 200 in a manner to account for a unique key bar 250 cross section shape (e.g., if dovetail shape like the inward facing portion interfacing with the lamination sections). However, while a semi-circular shape is illustrated here, the cutouts 240 may be formed in any shape complimentary to that of the corresponding key bar 250 according to other embodiments.

The cutouts 240 of each of the core ring compression bands 200 improve circumferential integrity of the key bars 250 against the lamination sections 260, improving the overall integrity of the stator core by allowing the core ring compression bands 200 to retain the key bars in place as well as exert an inward radial force. According to the embodiment illustrated in FIG. 2, the stator core assembly does not require rigid core support rings welded to the key bars 250, such as the rigid core support rings 140 described with reference to FIG. 1, because the core ring compression bands 200 provide additional structural integrity (e.g., circumferential and radial) beyond that provided by the conventional, flat compression bands 160. Moreover, in contrast to the conventional system described with reference to FIG. 1, a stator core assembly using core ring compression bands 200 provide better key bar 250 movement control and permit maintaining tighter tolerances associated with the key bar 250 orientation by not working against rigid core support rings (e.g., rigid core support rings 140 described with reference to FIG. 1). In addition, being formed from multiple semi-circular sections 210a, 210b, 210c coupled together allows each core ring compression band 200 to adjust to the specific key bar 250 orientation and shape at each location of the core ring compression band 200, as compared to conventional flat compression bands or rigid core support rings formed as a perfect circle. Accordingly, the core ring compression bands 200 described herein provide increased structural integrity to a stator core assembly, increase the specificity within which tolerances can be maintained, and also promote simpler and more cost-effective installation (e.g., reducing the number of overall components by eliminating separate rigid core support rings and also reducing the amount of welding required).

Although three semi-circular sections 210a, 210b, 210c are illustrated as forming a core ring compression band 200 in FIG. 2, any number of semi-circular sections can be coupled together to form a core ring compression band. For example, FIG. 3 illustrates another example embodiment of a core ring compression band 300 having a greater number of semi-circular sections 310a, 310b, 310c, 310d, 310e, 310f, 310g, 310h, 310i coupled together (e.g., nine in this example). According to one embodiment, as illustrated by FIG. 3, some semi-circular sections may be coupled together by one or more non-adjustable connectors 330 instead of adjustable connectors 320. For example, whereas semi-circular sections 310a and 310b, semi-circular sections 310d and 310e, and semi-circular sections 310g and 310h are each coupled via adjustable connectors 320, semi-circular sections 310b and 310c, semi-circular sections 310c and 310d, semi-circular sections 310e and 310f, semi-circular sections 310f and 310g, semi-circular sections 310h and 310i, and semi-circular sections 310i and 310a are coupled via non-adjustable connectors 330. According to various embodiments, any combination of adjustable connectors 320 and non-adjustable connectors 330 may be provided. Limiting the number of adjustable connectors 320 may reduce the cost, complexity, and installation efforts while increasing the integrity of the system. However, the greater number of semi-circular sections coupled via adjustable connectors 320 the more tunable the respective core ring compression band 300 will be for controlling key bar movement.

Non-adjustable connectors 330 can be any fastener suitable for coupling two contiguous ends of semi-circular sections, including, but not limited to, plate and bolt assemblies, welded assemblies, riveted assemblies, and the like.

FIG. 4 illustrates a partial perspective cross-section illustration of a stator assembly 400, according to one embodiment. For simplicity, only a portion of the stator assembly 400 is illustrated, and not all components are provided (e.g., no stator frame is illustrated). The stator assembly 400 can include multiple lamination sections 405 fit together around a central axis to form a substantially circular shaped lamination. Multiple laminations (each made up of multiple lamination sections 405) are coaxially stacked along the central axis to form the stator core. At the bottom of each lamination, winding slots 410 are provided to accommodate windings. At the peripheral edge 415 of the lamination sections 405 key bar grooves are formed for accepting a corresponding key bar 420. In the example illustrated here, the key bar grooves and corresponding key bars 420 are formed with a dovetail cross-section shape; however, any shape may be provided.

A core ring compression band 425, made from at least two semi-circular sections 427a, 427b is positioned over the key bars 420 encircling the stator core made of the multiple lamination sections 405. While only two semi-circular sections 427a, 427b are shown in FIG. 4, any number of semi-circular sections can be coupled together to form a core ring compression band 425. As can be seen, the core ring compression band 425 includes cutouts 430 into which the outwardly facing surface of the key bars 420 can fit. Also illustrated is an adjustable connector 435 adjustably coupling the first semi-circular section 427a and the second semi-circular section 427b. As illustrated, the core ring compression band 425 is positioned around the stator core spaced apart from a core support ring 440 affixed to or otherwise integrated with the key bars 420. It is appreciated that FIG. 4 illustrates only a partial section, and that multiple core ring compression bands 425 can be longitudinally spaced apart around the stator core.

FIG. 5 illustrates a longitudinal cross section view of a stator assembly 500. As referred to herein, the stator assembly 500 includes a stator core 505 formed by coaxially stacking laminations along an imaginary axis running longitudinally through the middle of the laminations. A key bar 510 is disposed within key bar grooves formed in the peripheral edge of each lamination. Multiple core ring compression bands 515 are shown longitudinally spaced apart along the length of the stator core and tightened around each key bar 510. The stator assembly 500 includes at least two core support rings, a first core support ring 520a and a second core support ring 520b, disposed around the stator core and longitudinally spaced apart, such as at or near a first end of the stator core and a second end of the stator core, and affixed to or otherwise integrated with the key bars 510. It is appreciated that only two core support rings 520 are illustrated herein for simplicity, and that according to other embodiments any number of core support rings 520 can be provided. According to one embodiment, at least one core ring compression band 515 is positioned between each core support ring 520a, 520b. For example, as illustrated, multiple core ring compression bands 515 are positioned between the first core support ring 520a and the second core support ring 520b. In various embodiments, core ring compression bands 515 may also be placed external to the one or more core support rings 520a, 520b.

The core support rings 520a, 520b are provided to facilitate integration with a stator frame 525. For example, in the embodiment illustrated in FIG. 5, multiple spring bars 530 are integrated with (e.g., inserted through or welded to) core support rings 520a, 520b. The spring bars 530 are then affixed to or otherwise integrated with the stator frame 525. For example, the spring bars 530 can be affixed to one or more section plates 535 extending inwardly from the interior surface of the stator frame. However, according to various other embodiments, any other techniques suitable for integrating multiple core support rings 520 with the stator frame 525 can provided.

FIG. 6 illustrates an example method 600 of manufacturing a stator assembly including multiple core ring compression bands, according to one embodiment of the invention.

The method 600 begins at block 605, in which multiple key bars are disposed within a stator frame extending longitudinally and in a circumferentially spaced apart orientation. The key bars can thus be positioned in a substantially circular or cylindrical orientation, such that the lamination sections can be stacked within the key bars and align complimentary key bar grooves formed in the peripheral edge of each lamination section with a respective key bar. It is appreciated, however, that according to another embodiment, the key bars may be disposed within the stator core and inserted into the key bar grooves after the laminations are stacked. Key bars are provided to offer axial integrity to the stacked laminations, as well as providing structure to which core support rings and core ring compression bands may be affixed and/or positioned for adding radial and circumferential integrity.

Following block 605 is block 610, in which at least two core support rings are positioned around the key bars and affixed to each of the key bars. As discussed above, the core support rings can be welded or otherwise affixed at the inner edges to each of the key bars.

Following block 610 is block 615, in which the core support rings are integrated with the stator frame for integrating the stator core with the stator frame. Like that illustrated in FIG. 5, each of the core support rings can be welded to each of the key bars and welded to spring bars which are integrated with the stator frame (e.g., via section plates, etc.). Though, according to other embodiments, any other means suitable for integrating the core support rings, and thus the stator core, with the stator frame can be implemented as desired.

Following 615 is block 620, in which multiple core ring compression bands are disposed around the key bars for ultimately surrounding the stator core. As described herein, core ring compression bands are made from multiple semi-circular sections coupled together. Thus, when placing each core ring compression band around the key bars, the individual semi-circular sections can be positioned and subsequently coupled, either by adjustable or non-adjustable connectors, simplifying the assembly process. Moreover, while placing the core ring compression bands around the key bars and/or when stacking the lamination sections, shims can be placed between the connectors to adjust the tension and placement of the core ring compression bands and can further be adjusted during and after assembly. While placing each core ring compression band around the stator core, cutouts formed in the inner edge of each core ring compression band are aligned with corresponding key bars, facilitating alignment and further providing structural integrity.

Following block 620 is block 625, in which multiple laminations are coaxially stacked within a stator frame to form a stator core, positioning them within the key bars. As described herein, the laminations can be formed by fitting together multiple lamination sections to form each lamination. Moreover, cutouts defined in a peripheral edge of each lamination section can be positioned around the inward facing edge of a corresponding key bar, facilitating the interface and placement of the lamination sections with the key bars.

Following block 625 is block 630, in which each of the core ring compression bands can be adjusted via the adjustable connectors. As described herein, according to various example embodiments, at least one adjustable connector coupling at least two contiguous semi-circular sections allows the inward radial force exerted by the core ring compression band to be adjusted and tuned to the specific key bar shape where the core ring compression band is positioned.

Further adjustments can be made to the key bars and their placement relative to the stator core via the adjustable connectors on one or more of the core ring compression bands. For example, during and upon completion of assembly, and/or during or after operation, additional adjustments may be to the core ring compression bands. For example, upon operation, the stator core movement and vibration can cause key bar rattle, which may be controlled by retaining the key bars within a predefined tolerance via the multiple core ring compression bands.

The method 600 can end after block 630, having assembled a stator core including core ring compression bands for controlling key bar movement.

Accordingly, systems, methods, and apparatus described herein provide stator core assemblies having core ring compression bands instead of conventional rigid core rings and conventional, flat compression bands. Utilizing core ring compression bands controls key bar movement to reduce key bar rattle and provides radial and circumferential structural integrity.

Many modifications and other embodiments of the exemplary descriptions set forth herein to which these descriptions pertain will come to mind having the benefit of the teachings presented in the foregoing descriptions and the associated drawings. Thus, it will be appreciated the invention may be embodied in many forms and should not be limited to the exemplary embodiments described above. Therefore, it is to be understood that the invention is not to be limited to the specific embodiments disclosed and that the modification and other embodiments are intended to be included within the scope of the appended claims. Although specific terms are employed herein, they are used in a generic and descriptive sense only and not for purposes of limitation.

The claimed invention is:

1. A stator assembly, comprising:
a stator core comprising a plurality of coaxially stacked laminations, each lamination comprising a plurality of lamination sections comprising at least one cutout defined in a peripheral edge, wherein the at least one cutout of each lamination section is axially aligned among the plurality of stacked laminations to define a plurality of key bar grooves extending longitudinally in a peripheral edge and spaced apart around a circumference of the stator core;
a plurality of key bars, each key bar disposed within a respective one of the plurality of key bar grooves;
at least a first core support ring and a second core support ring longitudinally spaced apart and disposed around the stator core, wherein each of the plurality of key bars is affixed to an inner edge of the first core support ring and the second core support ring;
a plurality of core ring compression bands longitudinally spaced apart and disposed around the stator core and the plurality of key bars, wherein each of the plurality of core ring compression bands is formed from a plurality of semi-circular sections coupled to form the respective core ring compression band, wherein each of the plurality of key bars is disposed within respective cutouts defined in an inner edge of the plurality of core ring compression bands, and wherein each of the core ring compression bands is structurally independent of the stator frame; and
a stator frame to which the first core support ring and the second core support ring are mounted.

2. The stator assembly of claim 1, wherein each of the plurality of core ring compression bands comprises at least one adjustable connector operable to adjustably connect at least two of the plurality of semi-circular sections.

3. The stator assembly of claim 1, wherein, for each of the plurality of core ring compression bands, at least two of the plurality of semi-circular sections are non-adjustably coupled.

4. The stator assembly of claim 1, wherein each of the plurality of core ring compression bands comprises a first semi-circular section, a second semi-circular section, and a third semi-circular section, wherein the first semi-circular section is adjustably coupled to the second semi-circular section.

5. The stator assembly of claim 4, wherein the second semi-circular section is adjustably coupled to the third semi-circular section and the third semi-circular section is adjustably coupled to the first semi-circular section.

6. The stator assembly of claim 1, wherein each of the plurality of cutouts defined in each of the plurality of core ring compression bands is formed in a shape at least partially complimenting the cross section shape of a respective key bar extending from the stator core.

7. The stator assembly of claim 1, wherein each of the core ring compression bands exert an inward radial force against the plurality of key bars.

8. The stator assembly of claim 7, wherein each of the core ring compression bands is adjustable by at least one adjustable connector connecting at least two of the plurality of semi-circular sections forming the respective core ring compression band, and wherein adjusting the at least one adjustable connector adjusts the inward radial force exerted against the plurality of key bars.

9. The stator assembly of claim 1, wherein the first core support ring and the second core support ring are mounted to the stator core assembly via a plurality of spring bars extending longitudinally and affixed to the first core support ring and the second core support ring.

10. A stator assembly, comprising:
a plurality of core ring compression bands longitudinally spaced apart and disposed around a stator core comprising a plurality of key bars extending longitudinally in a peripheral edge and spaced apart around a circumference of the stator core;
wherein each of the plurality of core ring compression bands is formed from a plurality of semi-circular sections coupled to form the respective core ring compression band, wherein each of the plurality of key bars is disposed within a respective one of a plurality of cutouts defined in an inner edge of each of the plurality of core ring compression bands, and wherein each of the core ring compression bands is structurally independent of a stator frame within which the stator core is contained.

11. The stator assembly of claim 10, wherein each of the core ring compression bands comprises the plurality of cutouts defined in an inner edge for at least partially mating with the plurality of key bars.

12. The stator assembly of claim 11, wherein each of the plurality of key bars comprises a first cross-section shape and each of the plurality of cutouts in the plurality of core ring compression bands comprises a second cross-section shape, wherein the second cross-section shape is at least partially complimentary to a portion of the first cross-section shape of the key bars extending from the stator core.

13. The stator assembly of claim 10, further comprising at least a first core support ring and a second core support ring longitudinally spaced apart and disposed around the stator core and affixed to the plurality of key bars, wherein the first core support ring and the second core support ring are affixed to the stator frame.

14. The stator assembly of claim 13, wherein at least one of the plurality of core ring compression bands is positioned between the first core support ring and the second core support ring.

15. The stator core assembly of claim 13, wherein the first core support ring and the second core support ring are affixed to the stator frame via a plurality of spring bars extending longitudinally and mounted to the first core support ring and the second core support ring.

16. The stator core assembly of claim 10, wherein each of the plurality of core ring compression bands comprises at least one adjustable connector operable to adjustably connect at least two of the plurality of semi-circular sections to form the respective core ring compression band.

17. A stator assembly, comprising:
a plurality of key bars extending longitudinally and circumferentially spaced apart;
at least two core support rings longitudinally spaced apart around the plurality of key bars and affixed to the plurality of key bars, wherein the at least two core support rings are integrated to a stator frame;
a plurality of core ring compression bands longitudinally spaced apart around the plurality of key bars, wherein each of the plurality of core ring compression bands is formed from a plurality of semi-circular sections coupled to form the respective core ring compression band, and wherein each of the core ring compression bands is structurally independent of the stator frame; and a plurality of laminations coaxially stacked within the plurality of key bars to form a stator core, each of the plurality of laminations comprising a plurality of lamination sections comprising at least one cutout defined in a peripheral edge, wherein the at least one cutout of each lamination section is axially aligned among the plurality of stacked laminations to define a plurality of key bar grooves extending longitudinally in a peripheral edge of the stator core and substantially aligning with the plurality of key bars.

18. The stator assembly of claim 17, wherein each of the plurality of core ring compression bands further comprises a plurality of cutouts defined in an inner edge substantially aligned with a respective one of the plurality of key bars.

19. The stator assembly of claim 17, wherein at least two of the semi-circular sections of each of the plurality of core ring compression bands are adjustably coupled via at least one adjustable connector.

* * * * *